United States Patent [19]
Barbanell

[11] Patent Number: 5,144,460
[45] Date of Patent: Sep. 1, 1992

[54] HIGH CONTRAST-RESOLUTION CAMERA

[75] Inventor: Joseph S. Barbanell, Concord, Calif.

[73] Assignee: The DZ Company, Concord, Calif.

[21] Appl. No.: 625,941

[22] Filed: Dec. 11, 1990

[51] Int. Cl.$^5$ .................. G03H 1/16; G02B 27/46; G06K 9/76

[52] U.S. Cl. ...................... 359/29; 359/30; 359/559; 359/564; 382/31; 382/45; 382/46; 382/54

[58] Field of Search .............. 350/162.12, 162.13; 382/31, 32, 46, 47, 50, 53; 359/29, 30, 559, 561, 564

[56] References Cited

U.S. PATENT DOCUMENTS

| | | | |
|---|---|---|---|
| 3,457,422 | 7/1969 | Rottmann | 382/46 |
| 3,620,591 | 11/1971 | Riggs | 359/564 |
| 3,639,039 | 2/1972 | Rhodes, Jr. | 359/564 |
| 3,976,982 | 8/1976 | Eiselen | 382/47 |
| 4,365,310 | 12/1982 | Green | 350/162.12 |
| 4,453,804 | 6/1984 | Evans | 350/162.12 |
| 4,674,824 | 6/1987 | Goodman et al. | 350/162.12 |
| 4,699,466 | 10/1987 | Brandstetter et al. | 350/162.12 |
| 4,934,782 | 6/1990 | Soffer et al. | 350/162.12 |
| 4,949,389 | 8/1990 | Allebach et al. | 350/162.12 |

OTHER PUBLICATIONS

L. S. Barbanel et al., "Study of a Homodyne Photometer with Phase Modulation", Optics & Spectrosc., vol. 49, No. 4, Oct. 1980, pp. 443–447.

L. S. Barbanel, "Signal Discrimination and Detection in the Presence of Nonadditive Noise," Optics & Spectrosc., May 1972, pp. 536–538.

*Primary Examiner*—Bruce Y. Arnold
*Assistant Examiner*—Martin Lerner
*Attorney, Agent, or Firm*—Limbach & Limbach

[57] ABSTRACT

A method and apparatus for registering an image using coherent radiation. Spatial homodyne means are employed to generate component signals which comprise a homodyne equivalent of the image, and the component signals of the homodyne equivalent are registered at a registering medium. Using a new principle of construction, the invention achieves on standard registering media a substantial improvement in conrast resolution. Indeed, the number of contrast levels that can be registerd by the invention is the square of the number that can be registered by the prior art. The application of temporal submodulation in a device embodying the invention additionally provides tensor parasitic phase-shift invariance. The invention may be embodied in a class of spatial-temporal-spatial image recording devices, such as videotape recorders and television transmission systems, in which a sequence of images is registered in the form of a temporal signal, and then reconverted from the temporal signal into sequence of reproduced images.

29 Claims, 3 Drawing Sheets

HIGH CONTRAST-RESOLUTION CAMERA

FIELD OF THE INVENTION

The invention relates to methods and apparatus for registering and storing images. In one embodiment, the invention relates to photographic apparatus for registering and reproducing an image with on the order of ten thousand intensity gradations.

BACKGROUND OF THE INVENTION

The invention may be embodied in still picture cameras, motion picture cameras, video-recorders, and other conventional image registration devices. Image registration devices embodying the invention can find immediate independent application in a wide range of systems, including automatic counters with laser light read-out systems (i.e., bar code scanners), computer systems with optical disk memory, audio and video optical disk players, night-vision devices, and laser microphones.

Throughout the specification, including in the claims, the phrase "image registration device" is employed to denote not only devices for imaging a time-invariant image (i.e., cameras), but also devices for imaging the output of spatial modulators which modulate a beam in a time-varying fashion (i.e., motion picture projectors).

The inventor has explained the application of homodyne methods to temporal carriers in the articles "Study of a Homodyne Photometer with Phase Modulation," Optics & Spectrosc., Vol. 49, No. 4, Oct. 1980, pp. 443-447, and "Signal Discrimination and Detection in the Presence of Nonadditive Noise," Optics & Spectrosc., May 1972, pp. 536-538. Similar homodyne methods are applied in the present invention to spatial carriers.

SUMMARY OF THE INVENTION

The inventive principle of device construction enhances the contrast resolution of registered images. Although based on a rather elaborate theoretical approach, devices embodying the invention achieve enhanced contrast resolution by very simple structural means.

An image registration device embodying the invention generates an image of an object using coherent radiation, and includes spatial homodyne means for generating component signals which comprise a homodyne equivalent of the image, and a registering medium for registering the component signals of the homodyne equivalent.

Using a new principle of construction, the invention achieves on standard registering media a substantial improvement in contrast resolution. Indeed, the number of contrast levels that can be registered by the invention is the square of the number that can be registered by the prior art.

The application of temporal submodulation in a device embodying the invention additionally provides tensor parasitic phase-shift invariance. The invention may be embodied in a class of "spatial-temporal-spatial" image recording devices, such as videotape recorders and television transmission systems, in which a sequence of images is registered in the form of a temporal signal, and then reconverted from the temporal signal into sequence of reproduced images.

DETAILED DESCRIPTION OF THE PREFERRED EMBODIMENTS

Figure 1:
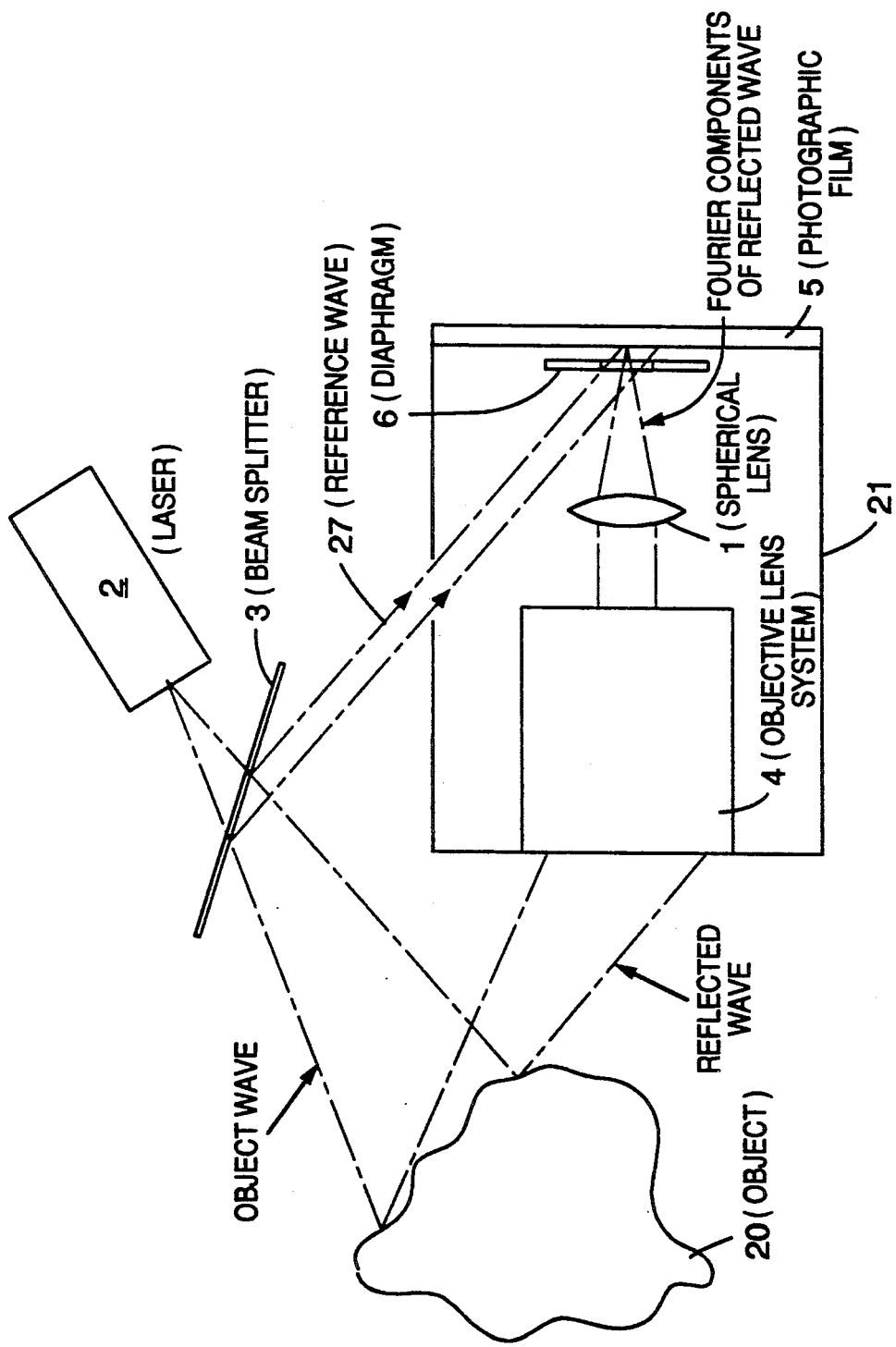
FIG. 1 is a schematic diagram of a preferred embodiment of an image registration device, of the spatial-spatial type, embodying the invention.

The inventive family of image registration devices disclosed herein is based on a very simple principle, not recognized prior to the present invention, regarding registering of light wave-front information. Recognition that the principle may be employed for recording device applications made it possible to synthesize a new and very simple family of such devices.

To understand the new principle being employed, the main disadvantages of the existing image registration devices should be appreciated.

All conventional image registration devices transform an amplitude wavefront distribution into a spatial distribution of a corresponding informational medium. In the simplest case of photocameras, the medium is photographic film, which is processed to reproduce the registered image.

In more sophisticated applications (additionally attractive for the method under discussion), such as in video tape recorders, the "input" distribution has previously undergone a temporal transformation. This is dictated by the demands of the electronic circuits used in such devices. In such devices, a multi-step transformation ("spatial-temporal-spatial") is implemented because a direct ("spatial-spatial") transformation is a practical impossibility. Due to the additional step of temporal transformation implemented in this class of devices, it is especially attractive to embody the invention in such devices.

All these conventional image registration devices transform and store the spatial amplitude (intensity) distribution of the wavefront (i.e., image). During this transformation, an important and general disadvantage is always introduced. This disadvantage is that all elements and media for transforming the intensity information possess a limited and not very high contrast resolution level (usually not higher than 0.5% of the media's dynamic range in intensity terms). This feature limits the ability of conventional devices of this sort to differentiate relatively small variations of incoming light intensities.

The explanation for this is as follows. Any light-sensitive medium (i.e., photo-emulsion layer in film for photocameras, or a phototransducing layer in videorecorders) can register only a finite exposure (intensity) difference H. The quantity H will sometimes be denoted herein as the contrast resolution level of the registering medium. This in turn, is explained by the presence of internal noise in the medium, and results in the impossibility of registering "super-fine" image structure. With the precision stated above, none of said conventional devices can transform and store/register more than 200 intensity gradations of the incoming light.

The ability or inability of a device or medium to register a large number of intensity gradations of incoming light is a characteristic that should not be confused (as is often done) with the sensitivity level of the medium/device (i.e., the possibility of registering intensities of given value). The sensitivity level is a separate characteristic, correlated to the contrast resolution, but in no case improving it. Usually, as the sensitivity level is raised, the contrast resolution decreases. This in turn is easily explained by the fact that raising the sensitivity level leads to a narrowing of the media's dynamic range, because only a part of the dynamic range is used. All the results discussed in this paragraph are well known.

Registration of only a low number of light intensity gradations leads to lower quality of the resulting image, the impossibility to define details whose intensity varies only slightly in intensity, as well as other disadvantages.

In conventional devices, these disadvantage are introduced on the first step of "input-output" image transformation and cannot be eliminated afterwards by any means in conventional (optically linear) devices of this family. This conclusion follows from well-known postulates of communication theory, and manifests itself in such a way that even very elaborate post-processing circuitry (sometimes incorporated in video-recorders, for example) cannot improve the number of light intensity gradations that can be registered by the corresponding device.

The above-explained disadvantage introduces the described general problem for all conventional image-transforming devices. It was recognized by the inventor that the disadvantage can only be overcome by nonlinear optical channel introduction. The latter can be realized in the presence of coherent illumination, which makes it possible to employ homodyne methods. It was also recognized by the inventor that the homodyne technique provides the simplest solution to the mentioned problem.

Nonlinear principles of light measurement and the corresponding self-contained nonlinear devices of the invention (described below), make it possible to increase considerably the parameter under discussion (i.e., the number of registrable light intensity gradations). An especially attractive feature of the invention is the very simple structural realization of the inventive family of devices.

Homodyne methods and devices have been suggested in the literature, for analysis of spatially uniform wavefronts. The inventor has recognized that for nonuniform wavefronts, corresponding procedures (discussed below) also bring the desired positive effect. The inventive device is intended for registration of spatially nonuniform wavefronts (images). The implementation of homodyne methods in the inventive device proved to be unexpectedly simple in structure, although the theoretical basis for the approach is rather elaborate.

Conventional homodyne techniques cannot be applied directly in the field of the present invention because such conventional techniques assume uniform incident wavefronts and temporal submodulation.

In the process of homodyne synthesis, the main problem is not to produce the homodyne signal but to separate the needed informative component signal from the resulting set of component signals. In the device of the invention, implementation of the required processing using analog and real time elements introduces additional limitations.

The invention may be embodied in two main types of devices that are similar in principle, but differ in realization:

(a) the sub-family of "spatial-spatial" devices; and
(b) the sub-family of "spatial-temporal-spatial" devices.

These subfamilies include independent subclasses of devices, including:

1. automatic counters of any type using the laser-light read-out (for example, bar code scanners). The contrast-resolution increase in devices of this type which embody the invention enables the volume of the input information to be decreased (i.e., by employing the inventive device, the number of printed lines present in UPC Code may be decreased);

2. computer peripheral devices of the type using an optical disk memory or laser read-out (and related consumer applications such as audio compact disk players and video compact disk players, using compact optical disks);

3. laser night-vision systems;

4. laser-microphones.

The inventive devices in these sub-classes have advantages including substantial increase of informational density and functional speed, and independently, increase of targeting accuracy. Targeting accuracy introduces a rather elaborate problem for systems with optical memory, with the tracing heads sometimes using even mechanical pregrooving.

These advantages are discussed below in connection with devices of "spatial-spatial" subclass (a). The inventive devices from "spatial-temporal-spatial" subclass (b) prove to be simpler in principle of realization.

The steps of synthesis for both subclasses are as follows:

1. construct the homodyne equivalent of the spatially distributed signal, 2. select, for the resulting signal, a signal separation procedure, 3. incorporate the foregoing procedures in a device using only standard, conventional elements.

With the incorporation of homodyne procedures, the optical channel becomes nonlinear, with all the advantages of the latter becoming realizable.

In the description given below, the suggested synthesis procedure is followed.

Subfamily (a)

The devices of this class include still photo cameras, motion picture cameras, and other similar devices. Because they produce directly a "spatial-spatial" transform, a corresponding fully spatial homodyne procedure, including signal separation, can be implemented.

Since the process of theoretical "spatial" homodyne construction is fully analogous to the temporal one, all the amplitudes of input signal should be multiplied by a reference signal, in accordance with the invention. The set of these amplitudes represents the input image. The process should be realized in such a way that the resulting signal provides unambiguous discrimination of all the amplitudes of the corresponding output set. In other words, an image represented by a two-dimensional set of intensities (amplitudes) should be transformed in such a way that each amplitude is multiplied by its "personal" reference signal. This entire procedure additionally should be real-time, analogous and unambiguous.

By realizing this procedure for each input amplitude from the set {A(x,y)}, the following set of signals is generated:

$$\{A'(x,y)\} = \{A(x,y)A_0(x,y)\} \quad (1)$$

where $A_0(x,y)$ is the amplitude of the "personal" reference wave. The signals in this set satisfy the relation $$A'(x,y) \leq H/[A_0(x,y)] \quad (2),$$

where H is the above-mentioned contrast resolution level of the registering medium.

It is easily seen that by implementing this procedure, the new value of this level H can be decreased proportionally to $A_0$. Then all the lower values of image contrast gradations can be registered. By implementing this method, the desired decrease in the contrast resolution level can reach up to the square root of the initial level H.

Seemingly the requirements for attaining this result are contradictory and convoluted. Yet, after the introduction of an additional image transform, a practical implementation of the method is easily produced.

The most difficult step in implementing the inventive procedure is to introduce, automatically and analogously, the set of "personal" reference signals corresponding to the input signal amplitudes. The personal reference signals should not additionally affect the input amplitude (intensity) distribution.

One direct approach to implement the mentioned introduction of personal reference signals is to perform time-consuming scanning, but such an approach would forbid real-time realization of the inventive method in this subfamily. Accordingly, it is preferable to introduce the above-mentioned additional transformation.

If the additional transformation is chosen to be the customary coherent optics Fourier-transform, the above-mentioned seemingly contradictory demands are satisfied easily. The initial image (the set of spatially distributed amplitudes {A(x;y)}) being Fourier-transformed, is then represented by the complex Fourier-spectrum F(x,y). The reference wave is then employed to register the Fourier-spectrum, a procedure commonly implemented in other coherent processing applications.

The use of an off-axis reference wave, however, necessitates a new and essential feature. By using a plane reference wave, the reference wave supplies different linear phase shifts for each component (harmonic) of spatially distributed spectrum. In other words, the reference wave represents the required set of "personal" reference signals, with a different phase shift for each component. This phenomenon manifests itself in standard holographic methods by unambiguity of reconstruction.

A set of different reference signals for all spectral harmonics is required for further signal separation. By providing such a set, the spatial homodyne is synthesized theoretically. Each one of the spatially separated components is then represented by:

$$A_0 F(x,y) e^{\{-ib(x,y)\}} \quad (3),$$

where b corresponds to reference wave angle of orientation.

From the transformation (3), it is easily seen that all harmonics of the spatial spectrum are multiplied by the reference value $A_0$, in that way providing the desired homodyne effect. By performing the transformation (3), any photoregistering or phototransducing medium with contrast resolution level H provides a signal contrast resolution satisfying relation (2).

The registering medium, for example the film negative in a still picture camera, holds the image information in the transformed form shown in (3). To be reconstructed (reproduced), it should be processed spatially. If reconstruction is accomplished by a spatial processing apparatus including means for performing an inverse Fourier-transform F' on the image being reconstructed, and means for directing an off-axis illuminating wave at the registering medium, the reconstructed image (i.e., the print developed from the negative) can be represented in the form:

$$\{F'(A_0 F(x,y))\} = \{A_0 A(x,y)\} \quad (4),$$

with precision up to any constants of transformation.

Because all information regarding the "personal" reference waves is included in the phase part of their set, the resulting image is being multiplied uniformly in space, and additional amplitude information is not introduced. Thus, the resulting image is not spoiled during the process of its improvement by an additional superimposed image.

Because all components of the reconstructed image (i.e., the photographic print) are multiplied by a constant amplitude $A_0$ which is not spatially dependent, the contrast resolution level H is correspondingly passed. The presence of the set of "personal" reference waves is automatically validated by the fact that performance of the inverse Fourier-transform is possible.

Though the transform (3) is of course well known, and has been implemented for example in conventional Fourier-holography, its homodyne advantages have not been recognized and procedures for saving the achieved advantages (homodyne effects) have not been proposed or implemented prior to the present invention.

The invention avoids the inherent disadvantage of conventional Fourier-holography that causes reprinting to be intentionally avoided because phase information is lost in the reprinting process, by the implementation of the additional elements and procedures described above (and to be described below in greater detail). These additional elements and procedures meet the demands explained above, and serve to save and usefully employ the results of the homodyne effect.

Synthesis of the general processing algorithm of the invention having been explained, the structure of corresponding devices embodying the invention will next be described. As mentioned, although the theoretical basis for the invention is rather elaborate, the structural embodiment of the invention in an apparatus is very simple. Both described sub-families of the inventive apparatus may embody the general processing algorithm of the invention. The "spatial-spatial" sub-family will be considered first, with reference to FIG. 1.

The image registration apparatus of FIG. 1 includes a laser flash bulb 2, and a beamsplitter 3 for dividing coherent radiation from flash bulb 2 into two portions. One portion (identified as reference wave 27) propagates from beamsplitter 3 (and optionally also from mirrors, not shown, adjacent beamsplitter 3) through diaphragm 6 to registering medium 5, which may be a piece of photographic film. A second portion of the coherent radiation, identified as the "object wave" in FIG. 1, propagates through beamsplitter 3 and is reflected from object 20. The coherent radiation reflected from object 20 propagates through objective lens system 4, additional spherical lens 1, and diaphragm 6 to registering medium 5. Lens 1 (which is sometimes referred to herein as the "additional" lens) is a conventional spherical lens for performing a Fourier-transform on the radiation incident on it.

If lens 1 is mounted between registering medium 5 and objective lens system 4 as shown in FIG. 1, registering medium 5 (photographic film in the FIG. 1 embodiment) should be positioned in the second back focal plane of objective lens system 4. In alternative embodiments of the invention, lens 1 is omitted and registering medium 5 is placed in the first back focal plane of objective lens system 4. Preferably, objective lens system 4 is fixedly mounted in housing 21, lens 1 is removably mounted in housing 21, and registering medium 5 may be mounted in housing 21 in either of two positions: the first and the second back focal plane of objective lens system 4.

To provide spatial-homodyne signal reception, the camera of the invention requires that radiation source 2 emits coherent radiation. In alternative embodiments, image registration may be performed not only using coherent radiation as in FIG. 1, but additionally using noncoherent (standard) light, to register two separate independent images on medium 5. In this case, the laser flashbulb preferably emits non-visible coherent radiation, so that the images may conveniently be separated during the image reconstruction step (sometimes referred to herein as the image "reproduction" or "printing" step) using corresponding illumination (both coherent and noncoherent).

The system of FIG. 1 may also include additional camera components (for example, autofocusing components). Only the components relevant to an understanding of the invention have been described.

The image registration system of FIG. 1 functions in the following manner. Laser flashbulb 2 emits a coherent illuminating pulse, which being reflected from object 20, forms the wavefront to be registered. This wavefront passes through the objective lens system 4, and its Fourier components appear on the surface of registering medium 5. Objective lens system 4 can be mounted in fixed relation to transforming lens 1 (as shown), or lens 1 may be omitted and registering medium 5 mounted in the first back focal plane of objective lens system 4 (as explained above).

With the help of beamsplitter 3, part of the laser pulse is directed on the film 5 inside the camera, and the homodyne procedure is realized (the set of spatial homodyne signals is formed). This concludes the step of registering the image.

The self-contained image registration device of FIG. 1 uses the principles similar to principles employed to generate a Fourier-hologram, but registers the image with much lower quality, hardly usable for subsequent 3-D reconstruction. This device is useful in combination with an image reconstruction device such as the image reconstruction device shown in FIG. 2.

Figure 2:
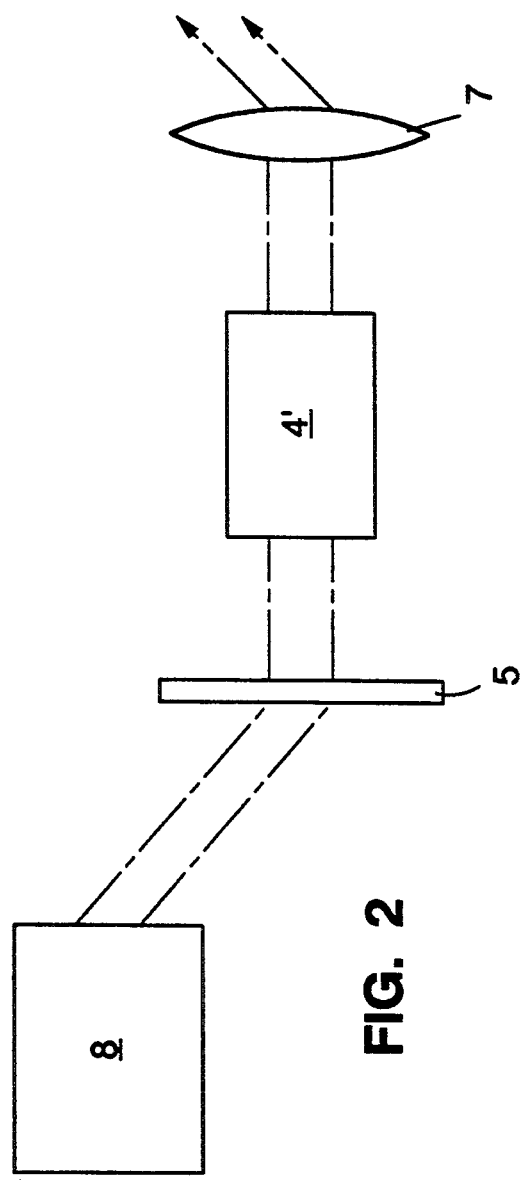
FIG. 2 is a schematic diagram of a preferred embodiment of an image reproduction device embodying the invention.

The device of FIG. 2 is capable of generating a print from the negative (the exposed medium 5) produced by the FIG. 1 device. The device of FIG. 2 includes printing laser 8, medium 5 (in which the registered image is stored), objective lens system 4', and printing transforming lens 7. Lens 7 implements the inverse of the transformation implemented by lens 1 in the FIG. 1 apparatus. During the image reconstruction process, the exposed medium 5 (having a transmittance satisfying transformation (3) and additionally possessing the set of homodyne signals) is illuminated by printing laser 8. This angle of illumination corresponds to the angle of incidence of reference wave 27 at medium 5 in the FIG. 1 apparatus. The resulting light beam propagates through objective lens system 4' and transforming lens 7, and may then expose photographic print paper (not shown in FIG. 2). After being inversely Fourier-transformed by lens 7, the beam acquires the form specified above in equation (4), and accordingly possesses all the above-discussed advantages.

The required use of coherent illumination in the inventive apparatus is not a disadvantage when the invention is embodied in devices which would require coherent illumination even if the invention were not embodied therein.

But even in devices of subfamily (a), the "disadvantage" of mandatory use of coherent illumination is offset by a number of positive effects. Some of these positive effects are listed below:

1. if coherent radiation is used, each film frame can be spatially compressed, without either informational or time losses. Compression can be realized either by using different angular orientations of reference wave 27, or by rotating the coherent radiation source 2, or both. Each of these compression procedures can provide up to twenty images to be registered on each negative frame without any additional structural measures being required.

Incorporation of a laser flash-bulb additionally increases the sensitivity level of the registering medium. This feature being secondary, it is not discussed in detail.

2. The presence of a coherent signal makes it possible to realize some additional functions. For instance, additional temporal submodulation may be included in the coherent beam to provide the signal (or signals) for both automatic precision exposure and distance measurements. The precise distance measurements can be realized even in an autofocusing mode. The separation of the corresponding signals is realized easily by standard means.

Introduction of temporal submodulation(s) introduction does not affect the image spectrum, having been already spatially modulated. Temporal submodulation is used indirectly in the devices of subfamily (a) for auxiliary functions. Its direct application in the devices of subfamily (b) provides both their simplification and improvement of their functional abilities.

In subfamily (a), when phase submodulation is performed, the invariance to parasitic spatial phase-shifts is provided immediately, because the inventive procedures are both real-time and automatic.

Subfamily (b)

The devices of subfamily (b) realize a "spatial-temporal-spatial" transform, and the application of temporal means of signal transforming in them is easily understandable. In these devices, both the homodyning process and temporal submodulation are used to provide the set of "personal" reference waves. For the synthesis of these devices, the above-derived general algorithm of functioning is employed.

Figure 3:
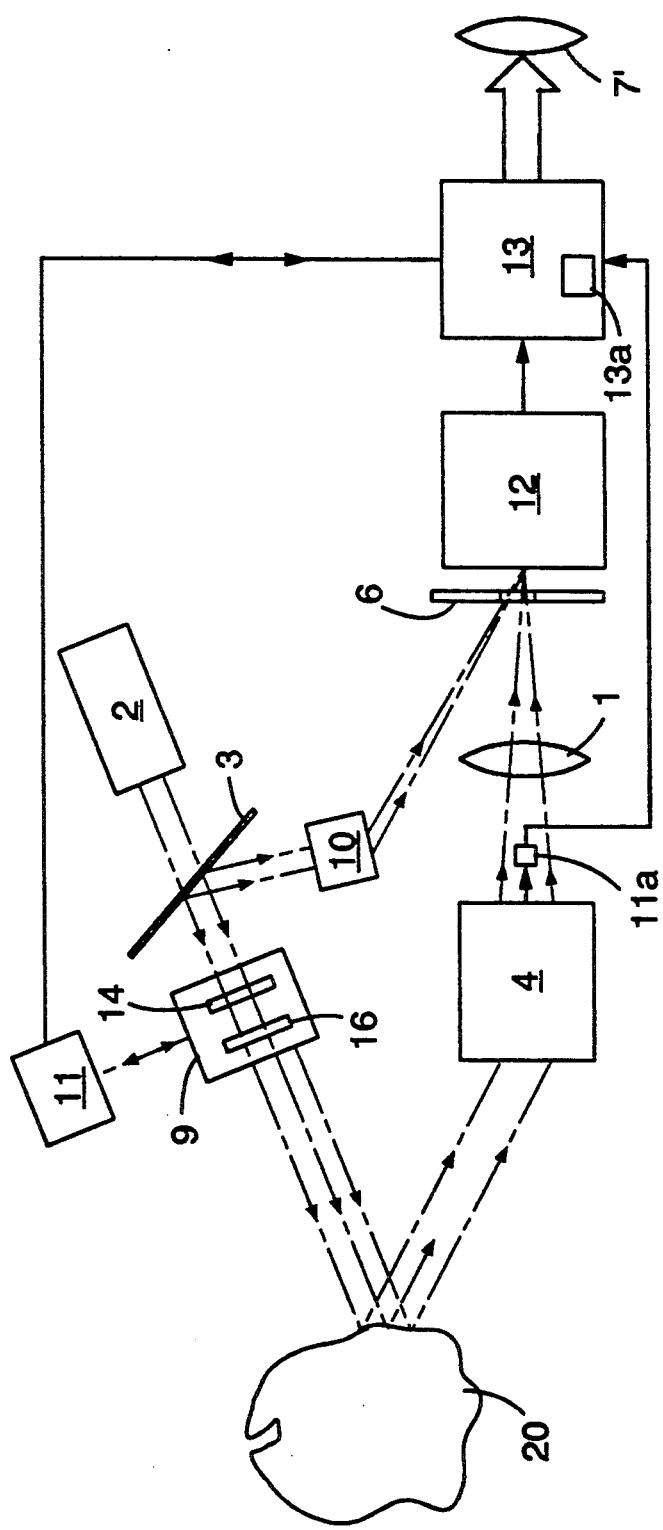
FIG. 3 is a schematic diagram of a preferred embodiment of an image registration device, of the spatial-temporal-spatial type, embodying the invention.

FIG. 3 is a generalized schematic block diagram of a device in sub-family (b). The FIG. 3 device includes: Fourier-transforming lens 1, laser flashbulb 2, beamsplitter 3, submodulator 9 (including amplitude temporal submodulation means 14 and phase temporal submodulation means 16), scanning device 10, submodulator monitor 11, objective lens system 4, diaphragm 6, phototransducer 12, electronic processor 13 (including storage means 13a), and inverse-Fourier-transforming lens 7'.

The device of FIG. 3 functions in the following way. A portion of the coherent light beam from flashbulb 2 reflects from object 20, and the reflected wave propagates through objective lens system 4, transforming lens 1, and diaphragm 6 to phototransducer 12. Lens 1 forms the corresponding spatial complex Fourier-spectrum in the plane of phototransducer 12.

The set of "personal" reference waves needed for homodyning registration of this spectrum is produced with the help of additional temporal submodulation. The employment of additional temporal submodulation is reasonable because the system processes temporal signals after the "optical intensity-to-electrical signal" transformation step implemented by phototransducer 12.

Additional temporal submodulation is introduced by modulator 9, which includes amplitude submodulation means 14 and phase submodulation means 16. The submodulation introduced by modulator 9 can be either amplitude submodulation or phase submodulation, or both, using corresponding conventional elements 14, 16, or both. Phase submodulation is most simply realized (phase submodulation means 16 can be a simple vibrating mirror). The introduced temporal modulating signal provides the signal separation required after homodyne registering, in a manner that is well understood theoretically. In subfamily (b), phase temporal submodulation additionally also provides the spatial phase-shifts invariance.

Various methods for introducing the "personal" reference wave introduction are possible. Two such methods are discussed below.

In the simplest case, when temporal submodulation is employed directly, and the reference wave (the coherent radiation diverted by beamsplitter 3 through scanning device 10 to transducer 12) is a plane coherent wave, discrete moments of time, t, correspond to different registered spatial spectral points. A signal indicative of the temporal submodulation is supplied from modulator detector 11 to processor 13, to supply to processor 13 the necessary information for the signal separation. In this embodiment, because the homodyne process is produced spatially, signal separation is realized temporally within processor 13.

Alternatively, coherent optical methods can be utilized. In this case, however, the inventive devices become more complicated.

In alternative embodiments of the inventive devices of subfamily (b), temporal submodulation is employed, and a signal from modulator monitor 11 is supplied to reference wave scanning device 10. Device 10 produces a spatial scanning of the reference wave from beamsplitter 3, whether focused or not. This allows the different spatial points to be separated temporally after the step of spatial homodyning. The read-out in such devices is usually realized by a scanning electronic beam, sequentially in time.

In the FIG. 3 embodiment, any needed inverse Fourier transform can be implemented either electronically within processor 13, or optically (by additional spherical lens 7' shown in FIG. 3).

If electronic temporal processing is initially incorporated in a device in which the invention is embodied, implementation of the inventive embodiments employing temporal submodulation is easily realizable. Temporal signal separation with the help of processor 13 makes the full procedure easier, and all the mentioned advantages of the homodyne method are present.

Modulator 9 and detector 11a can operate as an automatic exposure measuring and focusing means. Modulator 9 temporally submodulates the amplitude of the coherent wave. Detector 11a receives a portion of the temporally submodulated coherent wave reflected from object 20, generates an output signal indicative of this reflected portion, and supplies the output signal to processor 13 wherein it undergoes processing in a well known manner (including separation into components).

The inventive devices of subfamily (b) need not include means for implementing a Fourier-spectrum transformation. However, inclusion of such means may be desirable (for reasons to be explained below) and is contemplated for some applications.

In the simplest devices (for example, automatic bar code scanners, and optical disc devices for different applications), the input coherent signal can be homodyned directly and the step of Fourier-transformation can be omitted.

With the introduction of the "personal" reference wave, and with the subsequent signal separation performed in time by means of temporal submodulation only, all the homodyne effects and advantages are preserved. This inventive technique, if implemented in existing automatic bar code scanners, provides the resulting positive effect immediately. The contrast-resolution level is increased, and the volume of input information can be decreased correspondingly. In such devices embodying the invention, if the temporally submodulated reference wave is employed, the number of lines in the bar code can be decreased to one.

The advantages of implementing the Fourier-transform step in devices of subfamily (b) will next be discussed. As explained above, in the "spatial-spatial" devices of subfamily (a), this step is absolutely necessary. In the devices of subfamily (a), it can provide additionally the image-spatial compression, this being an auxiliary feature.

Using the Fourier-transform procedure step in sophisticated versions of the devices of subfamily (b) can introduce additional advantages. In these devices, image compression is a very important feature because it affects the functional speed of the corresponding electronic components. In these devices, when temporal submodulation is already included, the latter can be used to axially rotate individual spatial spectra from a set of spatial spectra which correspond to different images. If rotation, and not spatial displacement of the spectra is performed, the volume of resulting information dies not increase.

It should be mentioned here, that the informative part of spectrum is represented by higher spectral harmonica only. The lower harmonics, and d.c., especially, are noninformative. These lower harmonics can be additionally excluded (by optical means) by employing an appropriate diaphragm element 6. With diaphragm use, the volume of the compressed spatial signal is additionally decreased.

Diaphragm element 6 may be a set of diaphragms, any desired one of which can be selected to implement image compression on the component signals incident thereon, so that a desired compressed image is registered at the registering medium. In one embodiment, each of the diaphragms is an axial nontransparent diaphragm.

All the corresponding transformations utilize recognized techniques of image enhancement and are not discussed here. It should be mentioned that if Fourier-transforms are incorporated, all the powerful arsenal of coherent image enhancement techniques can be incorporated already on the optical level.

Up to forty different sequential images can be easily compressed, the functioning speed increasing correspondingly. The following functional procedure can be implemented to accomplish image compression.

The images in the form of their spatial spectra are sequentially stored on the transducing medium of phototransducer 12, including the homodyne signals. The entire resulting set is processed simultaneously, without time-lapse, with the informational volume not being increased. All the considerations are the same as explained above.

This procedure can be implemented in actual devices by sequential processing of the set of initial images. One example of a class of image processing devices embodying the invention will next be discussed.

It is recognized that a complex spectrum (i.e., both an amplitude and a phase spectrum) is present, even when an input object (image) is imaginary (i.e., when the input wavefront has a phase spectrum only). The invention can be embodied in image processing devices for registering such input objects. The advantages of this class of inventive devices are most representative, and no corresponding conventional devices exist.

Utilizing the unique precision features provided by this class of inventive devices, the following results are achieved:

1. phase media can be analyzed very precisely;
2. phase shifts both in the media and wavefronts can be measured;
3. partially or fully mechanically erased images can be analyzed because the phase changes are still present in the input image after the erasing process.

Some very important features of all the devices under claim should be emphasized. Use of laser illumination is introduced only to meet the demands of homodyning. Coherent wave front properties (phase processing) are used during the final processing step only; no 3-D reconstruction of the resulting image is generated. Considering this, lasers having low coherence (and low-cost) can be used, especially in image reconstruction devices embodying the invention (such as that described with reference to FIG. 2)

In all devices and methods embodying the invention, the laser radiation wavelength can be chosen to be either within the visible band, or outside the visible band. In the latter case, the following two possibilities exist.

All the described procedures can be realized parallely in time with ordinary recording/storing images procedures (employing visible light), with both the inventive homodyned images and the standard images being registered. In this way additional "spectral compression", not affecting the complexity of inventive devices, is realized.

Alternatively, if photographic film sensitive only to visible radiation is used, visual image registration is unaffected by the presence or absence of an embodiment of the invention which employs only non-visible coherent radiation.

For one example, the invention may include an infrared laser. Such an embodiment necessitates use of more complicated corresponding components of the inventive system (such as special lens systems). However, this embodiment of the invention can be immediately employed in all the applications of conventional nightvision devices.

Some limitations inherent with use of a coherent flashbulb will next be discussed. One serious disadvantage is the limited distance range of devices under claim, which range is dependent on the power of laser flash. This feature, however, does not limit the applications of the invention in microphone systems. In microphone systems the direct employment of homodyning with additional temporal submodulation, in accordance with the invention, brings an immediate improvement either in an increase in precision or functioning speed.

Another limitation is that coherent wave propagation in open space (air) can introduce parasitic fluctuations. However, this problem can be solved by implementing phase temporal submodulation (preferably temporal SSB-homodyne modulation) in the inventive system in the manner described above. This results in performance of image registration in a manner substantially invariant to any parasitic fluctuations, including even tensor-like parasitic phase-shifts.

In embodiments of the invention using temporal submodulation in one or both of the reflected and reference beams incident at the registering medium, signal processing and separation is realized in time in processor 13 as a sequence of temporally distributed auxiliary time-homodyning steps.

Preferably, processor 13 is programmed to process the signals in a manner providing the needed phase-invariance, and to implement the most "energy-profitable" SSB transceiving algorithm.

There is another, secondary, limitation of the inventive apparatus. Operation of a coherent light flash-bulb in the presence of incoherent additional illumination may decrease the dynamic range of a registering medium, which in turn will affect the quality of the registered image. To compensate for this limitation, the inventive system may include a sufficiently powerful flash-bulb (a very powerful pulsed source, such as a laser flash-bulb, is relatively inexpensive to design and practical to operate), or a registering medium particularly sensitive to frequencies in the region of the laser frequency.

In summary, the invention achieves high contrast resolution by implementing new principles recognized by the inventor using a new combination of standard hardware components. Embodiments of the invention include:

1. the class of "spatial-spatial" devices (subfamily (a), which includes, for example, still picture cameras), which require a means for implementing a Fourier-transform of the image to be registered, but which do not require means for implementing temporal submodulation;

2. the class of "spatial-temporal-spatial" devices (subfamily (b)), which require means for implementing temporal submodulation, but do not require means for implementing a Fourier-transform of the image to be registered.

In the "spatial-temporal-spatial" devices, the set of reference waves can be realized electronically. An example of such a device, employing phase submodulation, is a laser microphone.

Alternatively, in the "spatial-temporal-spatial" devices, the set of reference waves can be realized spatially (by scanning).

In the "spatial-temporal-spatial" devices, a means for implementing a Fourier-transform, an image enhancement means, and an image compression means of the type described above can be incorporated. An example of this type of device is a videorecorder.

In the "spatial-temporal-spatial" devices, both a means for implementing a Fourier-transform, and a means for image enhancement can be omitted, and the set of reference waves produced either spatially or temporally. An example of this type of device is an automatic laser counter.

Some embodiments of the invention employ coherent radiation outside the visible spectrum. Embodiments employing infrared radiation can be used for night-vision purposes.

For color photography, the coherent radiation source should be capable of sequentially emitting three different colored beams.

Various combinations of components of the specific examples of the inventive devices described herein can be implemented.

Throughout the specification, including in the claims, the phrase "objective lens system" is employed to denote either a single objective lens, or a set of lenses that function together as an objective lens.

Various modifications and alterations in the structure and method of operation of the invention will be apparent to those skilled in the art without departing from the scope and spirit of this invention. Although a specific preferred embodiment of the invention has been described, it should be understood that the invention as claimed should not be unduly limited to such specific embodiment.

What is claimed is:

1. An image registration device, including:
   (a) means for generating a time-independent, spatially continuous, object beam of coherent radiation representing an image of an object, and a time-independent, spatially continuous reference beam of coherent radiation;
   (b) spatial homodyne means for generating a homodyne equivalent of the image from the object beam and the reference beam;
   (c) a registering medium for registering the homodyne equivalent; and
   (d) means for illuminating the registering medium with a time-independent, coherent printing beam to generate from the registered homodyne equivalent an image beam representing a reconstructed version of the image, and means for focusing the image beam for printing said reconstructed version of the image.

2. The device of claim 1, wherein element (a) includes:
   a laser flash means for generating the coherent radiation comprising the object beam and the reference beam; and
   wherein element (b) includes a means for implementing a spatial-spatial transform of the object beam prior to generating the homodyne equivalent.

3. The device of claim 2, wherein said means for implementing a spatial-spatial transform includes a transforming spherical lens.

4. The device of claim 3, wherein element (a) includes an objective lens system having a first back focal plane and a second back focal plane, and including:
   means for mounting the registering medium in the second back focal plane of the objective lens system.

5. The device of claim 1, wherein the coherent radiation has a wavelength outside the visual radiation wavelength band.

6. The device of claim 5, wherein the registering medium is sensitive both to the coherent radiation wavelength outside the visual radiation wavelength band, and to noncoherent visual radiation reflected from the object.

7. The device of claim 1, wherein the registering medium has a dynamic range, and wherein said reconstructed version of the image has on the order of ten thousand separately distinguishable intensity gradations within the dynamic range of the registering medium.

8. The device of claim 1, wherein the means for focusing the image beam includes:
   an additional transforming spherical lens in the path of the image beam for generating from the image beam a transformed image beam representing a reproduction of the image.

9. The device of claim 1, wherein the registering medium is photographic film.

10. The device of claim 1, also including:
    (e) a means for orienting the homodyne equivalent into a desired orientation, so that said homodyne equivalent may be registered on the registering medium in said desired orientation.

11. The device of claim 1, wherein the registering medium has a contrast resolution level equal to H, and wherein the reconstructed version of the image has on the order of $(H)^2$ intensity gradations.

12. An image registration device, including:
    a means for generating an image of an object using coherent radiation, including an objective lens system having a first back focal plane and a second back focal plane, a laser flash means for generating the coherent radiation, and a means for generating a coherent reference wave from the coherent radiation;
    spatial homodyne means for generating component signals which comprise a homodyne equivalent of the image, including a transforming spherical lens for implementing a spatial-spatial transform of the image;
    a registering medium for registering the component signals of the homodyne equivalent;
    means for mounting the registering medium in the second back focal plane of the objective lens system;
    means for mounting the registering medium in the first back focal plane of the objective lens system; and
    means for removably mounting the transforming spherical lens in a first position between the registering medium and objective lens system, so that the device is operable in a first mode with the transforming spherical lens in said first position and the registering medium in the second back focal plane of the objective lens system, and in a second mode with the transforming spherical lens removed from said first position and the registering medium in the first back focal plane of the objective lens system.

13. An image registration device, including:

(a) means for generating an image of an object using coherent radiation;

(b) spatial homodyne means for generating component signals which comprise a homodyne equivalent of the image;

(c) a registering medium for registering the component signals of the homodyne equivalent; and a set of diaphragms positioned between elements (b) and (c), for implementing image compression on the component signals so that a compressed image is registered at the registering medium.

14. The device of claim 13, wherein the diaphragms are axial nontransparent diaphragms.

15. An image registration device, including:

means for generating an image of an object using coherent radiation;

spatial homodyne means for generating component signals which comprise a homodyne equivalent of the image;

a registering medium for registering the component signals of the homodyne equivalent;

means for reproducing the image from the registered component signals;

means for projecting coherent radiation onto the registering medium;

an additional transforming spherical lens, for receiving a transmitted portion of the coherent radiation, which has propagated through the registering medium, to generate transformed radiation representing a reproduction of the image;

means for registering the transformed radiation; and a set of diaphragms positioned between the additional transforming spherical lens and the means for registering the transformed radiation, for implementing image compression on the transformed radiation, so that a compressed image is registered at the means for registering the transformed radiation.

16. The device of claim 15, wherein the diaphragms are axial nontransparent diaphragms.

17. An image registration device, including:

means for generating an image of an object using coherent radiation;

spatial homodyne means for generating component signals which comprise a homodyne equivalent of the image;

a registering medium for registering the component signals of the homodyne equivalent; and a means for orienting the component signals of the homodyne equivalent into a desired orientation, so that said component signals may be registered on the registering medium in said desired orientation, including means for rotating the component signals.

18. An image registration device, including:

means for generating an image of an object using coherent radiation;

spatial homodyne means for generating component signals which comprise a homodyne equivalent of the image;

a registering medium for registering the component signals of the homodyne equivalent; and a means for orienting the component signals of the homodyne equivalent into a desired orientation, so that said component signals may be registered on the registering medium in said desired orientation, including means for laterally displacing the component signals.

19. A method for registering an image, including the steps of:

(a) generating a time-independent, spatially continuous, object beam of coherent radiation representing an image of an object, and a time-independent, spatially continuous reference beam of coherent radiation;

(b) generating a spatial homodyne equivalent of the image from the object beam and the reference beam;

(c) registering the spatial homodyne equivalent on a registering medium; and (d) illuminating the registering medium with a time-independent, coherent printing beam to generate from the registered spatial homodyne equivalent an image beam representing a reconstructed version of the image, and focusing the image beam to enable printing of said reconstructed version of the image.

20. The method of claim 19, also including the steps of:

generating the coherent radiation by operating a laser flash means; and wherein step (b) includes the step of implementing a spatial-spatial transform of the object beam prior to generation of the spatial homodyne equivalent.

21. The method of claim 20, wherein the spatial-spatial transform is implemented by means of a transforming spherical lens.

22. The method of claim 19, wherein the coherent radiation has a wavelength outside the visible radiation wavelength band.

23. The method of claim 19, wherein the registering medium has a dynamic range, and wherein the image is reconstructed from the registered spatial homodyne equivalent with on the order of ten thousand separately distinguishable intensity gradations within the dynamic range of the registering medium.

24. The method of claim 19, wherein step (d) includes the step of:

positioning an additional transforming spherical lens in the path of a portion of the printing beam which has propagated through the registering medium, to generate transformed radiation representing a reproduction of the image; and registering the transformed radiation.

25. The method of claim 19, also including the step of:

(e) orienting the spatial homodyne equivalent into a desired orientation, and registering the spatial homodyne equivalent the registering medium in said desired orientation.

26. A method for registering an image, including the steps of:

generating an image of an object using coherent radiation;

generating component signals which comprise a spatial homodyne equivalent of the image;

registering the component signals of the spatial homodyne equivalent; and performing image compression on the component signals.

27. A method for registering an image, including the steps of:

(a) generating an image of an object using coherent radiation;

(b) generating component signals which comprise a spatial homodyne equivalent of the image;

(c) registering the component signals of the spatial homodyne equivalent; and (d) reproducing the image from the registered component signals, by projecting coherent radiation onto the registering medium and positioning an additional transforming spherical lens in the path of a transmitted portion of the coherent radiation which has propagated through the registering medium to generate transformed radiation representing a reproduction of the image, and registering the transformed radiation; wherein step (d) includes the step of performing image compression on the transformed radiation by positioning a set of diaphragms in the path of the transformed radiation before registering the transformed radiation.

28. A method for registering an image, including the steps of:

(a) generating an image of an object using coherent radiation;

(b) generating component signals which comprise a spatial homodyne equivalent of the image;

(c) registering the component signals of the spatial homodyne equivalent; and (d) orienting the component signals of the homodyne equivalent into a desired orientation, so that said component signals may be registered on a registering medium in said desired orientation, wherein step (d) includes the step of rotating the component signals.

29. A method for registering an image, including the steps of:

(a) generating an image of an object using coherent radiation;

(b) generating component signals which comprise a spatial homodyne equivalent of the image;

(c) registering the component signals of the spatial homodyne equivalent; and (d) orienting the component signals of the homodyne equivalent into a desired orientation, so that said component signals may be registered on a registering medium in said desired orientation, wherein step (d) includes the step of laterally displacing the component signals.

* * * * *